(No Model.)
W. W. HUNTOON & A. F. PERKINS.
HORSE NECK POKE.
No. 439,598. Patented Oct. 28, 1890.
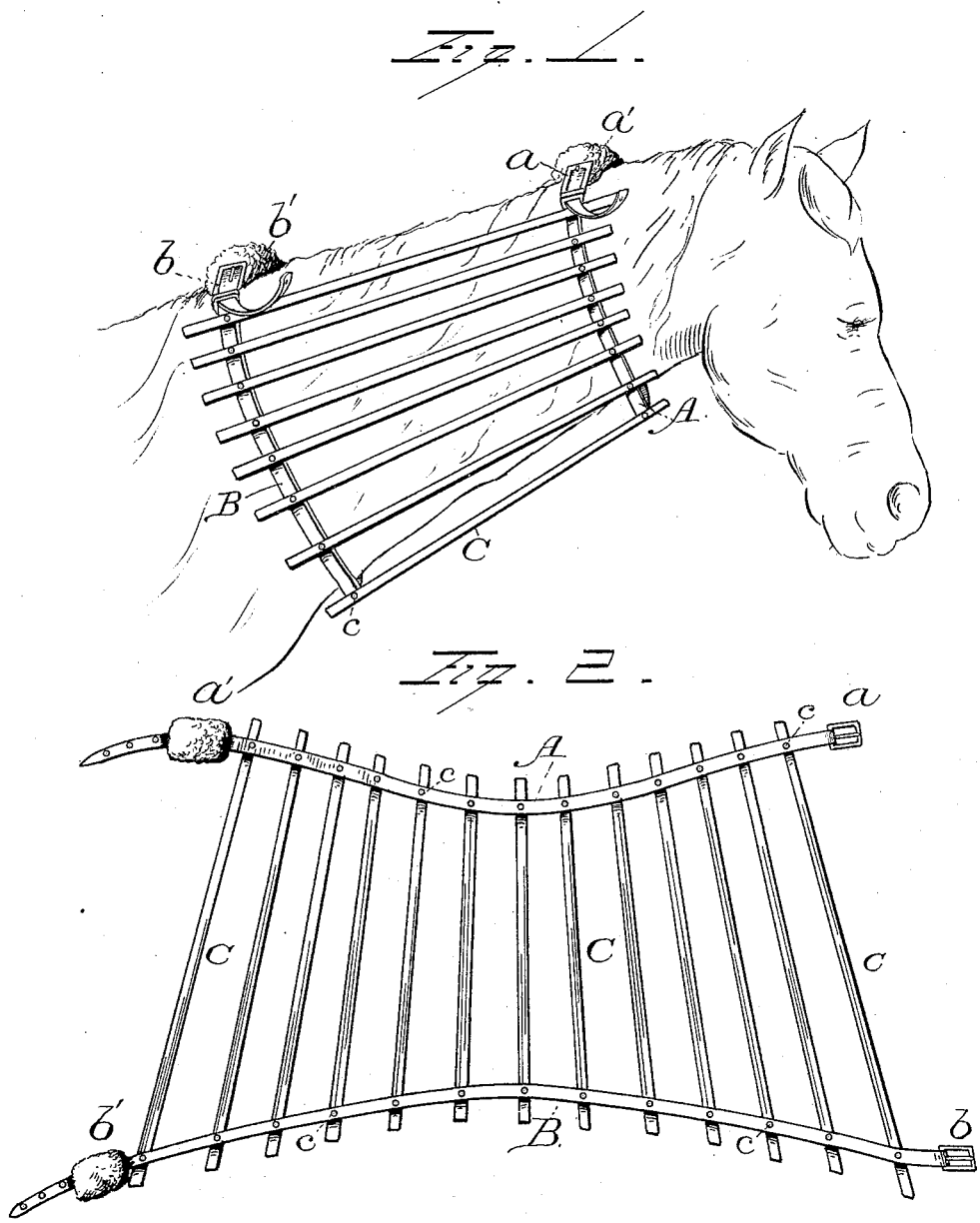
WITNESSES
INVENTOR

UNITED STATES PATENT OFFICE.

WILLIAM W. HUNTOON AND ALBION F. PERKINS, OF SOUTH NORRIDGE-WOCK, MAINE.

HORSE-NECK POKE.

SPECIFICATION forming part of Letters Patent No. 439,598, dated October 28, 1890.

Application filed July 19, 1890. Serial No. 359,319. (No model.)

*To all whom it may concern:*

Be it known that we, WILLIAM W. HUNTOON and ALBION F. PERKINS, citizens of the United States, residing at South Norridgewock, in the county of Somerset and State of Maine, have invented certain new and useful Improvements in Horse-Neck Pokes; and we do hereby declare the following to be a full, clear, and exact description of the invention, such as will enable others skilled in the art to which it appertains to make and use the same.

The object of this invention is to prevent a vicious horse from biting any one while standing in the stall and from tearing his blanket or doing other mischief which requires the bending of the neck. To this end we make use of a series of light but stiff rods, bars, or slats arranged lengthwise of the horse's neck and attached near their ends to two leather collars or neck-straps, one being close to the animal's head and the other close to his body.

In the accompanying drawings, Figure 1 represents a perspective view of the device embodying our invention as applied on the horse's neck, and Fig. 2 represents a plan view of the same opened out.

A designates the forward collar or neck-strap, which fits around the horse's neck close to his head, and is fastened by a buckle $a$.

B designates a second and larger collar or neck-strap, which also fits around the horse's neck, but close to his shoulders, being secured by a buckle $b$. These straps or collars are provided with pads $a'$ $b'$, of wool, to prevent galling the withers. From one of the said straps to the other parallel rods, bars, or slats C, of wood, extend, being fastened thereto by rivets $c$ or other suitable means. Any light stiff material of proper strength may be substituted for wood in them. Their ends extend beyond each of said collars or neck-straps. When said collars are fastened, as in Fig. 1, the said bars converge from the rear toward the front. They will not hurt the horse in any way, and do not fit closely enough to be uncomfortable, but will effectually prevent him from bending his neck sidewise to get at his blanket or attendant.

Having thus described our invention, what we claim as new, and desire to secure by Letters Patent, is—

A device for restraining a horse's head and neck, consisting of a smaller forward collar, a larger rearward collar, and a series of rigid rods or bars extending from the one collar to the other, substantially as set forth.

In testimony whereof we affix our signatures in presence of two witnesses.

WILLIAM W. HUNTOON.
ALBION F. PERKINS.

Witnesses:
JOHN H. MITCHELL,
C. A. HARRINGTON.